United States Patent
Desies et al.

(10) Patent No.: US 11,872,995 B2
(45) Date of Patent: Jan. 16, 2024

(54) METHOD FOR PREDICTING A DRIVING MANEUVER IN A DRIVER ASSISTANCE SYSTEM

(71) Applicant: Robert Bosch GmbH, Stuttgart (DE)

(72) Inventors: Adrien Desies, Kehl (DE); Lorenz Quack, Stuttgart (DE); Markus Maier, Heimsheim (DE); Michael Baumann, Leonberg (DE); Mostafa Alavi, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 155 days.

(21) Appl. No.: 17/374,344

(22) Filed: Jul. 13, 2021

(65) Prior Publication Data
US 2022/0024467 A1    Jan. 27, 2022

(30) Foreign Application Priority Data
Jul. 24, 2020 (DE) .......................... 102020209352.0

(51) Int. Cl.
*B60W 50/00* (2006.01)

(52) U.S. Cl.
CPC ..... *B60W 50/0097* (2013.01); *B60W 2520/10* (2013.01); *B60W 2520/12* (2013.01); *B60W 2520/14* (2013.01); *B60W 2556/10* (2020.02)

(58) Field of Classification Search
CPC ......... B60W 50/0097; B60W 2556/10; B60W 2520/10; B60W 2520/12; B60W 2520/14
See application file for complete search history.

(56) References Cited

U.S. PATENT DOCUMENTS 11,480,963 B2 * 10/2022 Gao .................... G05D 1/0212
2017/0016734 A1 * 1/2017 Gupta .................. B60W 30/00
2021/0370980 A1 * 12/2021 Ramamoorthy ..... G08G 1/0116

FOREIGN PATENT DOCUMENTS

DE    102019109569 A1    12/2019

* cited by examiner

*Primary Examiner* — Nicholas Kiswanto
*Assistant Examiner* — Jamal A Shah
(74) *Attorney, Agent, or Firm* — NORTON ROSE FULBRIGHT US LLP

(57) ABSTRACT

A method for predicting a driving maneuver in a driver assistance system of a motor vehicle. Based on dynamic data of the vehicle detected with the aid of sensors, a history of a driving maneuver, which is not yet completed, is recorded and, based on the history, a future course of the driving maneuver is predicted. Multiple hypotheses for potentially occurring driving maneuvers are represented by respective associated sets of parameters. A theoretical history of the driving maneuver is calculated based on the parameters for each hypothesis. The recorded history is compared to at least one of the theoretical histories. Based on a similarity degree, the hypothesis which describes the presently occurring driving maneuver with the highest probability is determined and output as the prediction result.

10 Claims, 4 Drawing Sheets

METHOD FOR PREDICTING A DRIVING MANEUVER IN A DRIVER ASSISTANCE SYSTEM

CROSS REFERENCE

The present application claims the benefit under 35 U.S.C. § 119 of German Patent Application No. DE 102020209352.0 filed on Jul. 24, 2020, which is expressly incorporated herein by reference in its entirety.

FIELD

The present invention relates to a method for predicting a driving maneuver in a driver assistance system of a motor vehicle, in which, based on dynamic data of the vehicle detected with the aid of sensors, a history of a driving maneuver, which is not yet completed, is recorded and, based on the history, a future course of the driving maneuver is predicted.

BACKGROUND INFORMATION

German Patent Application No. DE 10 2019 109 569 A1 describes a method in which, based on the recorded history, the reaction force is controlled which the driver perceives during a steering maneuver when turning the steering wheel.

The present invention furthermore relates, in particular, to a method for driver assistance systems, which in the broader sense should also include safety systems such as automatic emergency braking systems, in which in general the driver himself or herself has control over the guidance of the vehicle, however under particular conditions certain interventions in the vehicle guidance, driving recommendations or warnings are prompted by the assistance system. In such a system, a decision must be made in every situation as to whether an intervention of the driver assistance system is necessary, and if so, what this intervention should involve. These decisions require reliable knowledge as to which driving maneuvers the driver presently intends or has already initiated.

However, there are situations in which it is not clear from the outset which driving maneuver the human driver intends to execute. For example, when the vehicle approaches an intersection, it is initially not readily apparent whether the driver intends to continue to drive straight ahead or to turn right or left. If it seems that the driver is about to turn into a multi-lane intersecting street, it is still uncertain which of the multiple lanes the driver will select.

SUMMARY

It is An object of the present invention to improve the prediction of the driving maneuver in ambiguous traffic situations.

According to an example embodiment of the present invention, the object may be achieved in that multiple hypotheses for potentially occurring driving maneuvers are represented by respective associated sets of parameters, a theoretical history of the driving maneuver is calculated based on the parameters for each hypothesis, the recorded history is compared to at least one of the theoretical histories, and, based on a similarity degree, the hypothesis which describes the presently occurring driving maneuver with the highest probability is determined and output as the prediction result.

According to an example embodiment of the present invention, the conceivable driving maneuvers are thus classified based on characteristic features of the associated histories, and the hypothesis whose history has the greatest similarity to the history recorded based on the dynamic data is selected from the multiple hypotheses for the presently occurring driving maneuver.

Advantageous embodiments and refinements of the present invention are disclosed herein.

The history recorded based on the dynamic data may, in particular, include a mathematical description of the trajectory traveled recently by the vehicle. When an intersection is approached, for example, it is then already possible to decide at an early stage based on the curvature of the trajectory whether the driver intends to turn right or left. Based on this decision, it is then possible to predict the further course of the trajectory and, based on this prediction, it is then possible to decide, for example, whether there is a risk of a collision with another road user.

The dynamic data which are used to record the history may, in particular, be data which may be measured using vehicle-internal sensor on board the vehicle, for example the driving velocity and the yaw rate. The theoretical histories, which correspond to the plausible hypotheses for driving maneuvers in a given situation, may then be modeled in each case with the aid of a set of parameters or, if necessary, also only with the aid of a single parameter. For example, a turning maneuver at a T-intersection may be modeled as a history during whose course the yaw angle of the vehicle overall changes by 90°. Such a turning maneuver may then be modeled as a history which indicates the change of the yaw angle as a function of the path covered by the vehicle. In a simple model, three phases may be distinguished in this history, namely an introductory phase, in which the yaw rate increases linearly from 0 to a predetermined value, a main phase, in which the yaw rate remains constant at the value reached at the end of the introductory phase, and a conclusion phase, in which the yaw rate decreases linearly to 0 again. In the main phase, the vehicle travels a circular arc-shaped trajectory, i.e., a path having a constant curvature, while the trajectories during the introductory and concluding phases are clothoids. It may be assumed in the process that the history is symmetrical in terms of the introductory phase and the concluding phase having the same length. When additionally assuming that the ratio of the length of the trajectory in the main phase to the sum of the lengths of the trajectories in the introductory and concluding phases has a fixed value x, the entire history may be described using only a single parameter, namely the maximum yaw rate which the vehicle has during the main phase. However, the length ratio x may selectively also be regarded as a free parameter so that every assumed value of x describes another hypothesis.

Any common similarity degree may be used for the comparison of the recorded history to the theoretical histories, for example the mean square deviation. In this case, the comparison not only supplies the hypothesis which describes the present driving maneuver with the highest probability, but, with the similarity degree for this hypothesis, also a measure of the quality or reliability of the prediction. This quality criterion may then be taken into consideration in decisions regarding the interventions to be carried out by the driver assistance system.

The recording of the physical history which is based on the dynamic data may be continued during the test of the hypotheses so that, while the recording progresses, an increasingly larger data base is obtained, and thus increasing reliability of the prediction is achieved.

In one specific embodiment of the present invention, the prediction of the driving maneuver takes place exclusively based on the dynamic data of the vehicle, regardless of external data such as location data of a radar sensor, GPS data, and the like. This method variant has the advantage that a very robust prediction based on the very low-noise signals of the vehicle-internal sensors is obtained, while signals which represent external variables are usually considerably more noisy.

However, selectively it is also possible to consider external data in the recorded history. In particular, it may be appropriate to consider location data which indicate the location of the host vehicle in a digital map of the road network in the evaluation, so that the selection of the hypotheses to be tested may already be adapted to the present traffic infrastructure. It is possible, for example, to check based on the digital map whether the assumption is justified that the vehicle will negotiate a 90° curve when turning into an intersecting street. The digital map may also include information about the number of available lanes, so that a dedicated hypothesis may be established for each lane.

The hypothesis which is ultimately used for predicting the driving maneuver may also be created by the fusion of multiple hypotheses for which a low similarity degree was found during the comparison to the recorded history. For example, this hypothesis may be created by forming a sum from multiple hypotheses which is weighted according to degree of similarity.

It is also possible to take certain boundary conditions into consideration during the test of the hypotheses or already during a preselection of the hypotheses to be tested. For example, a hypothesis that a turning maneuver is being initiated may be discarded from the outset when the inherent velocity of the vehicle exceeds a certain limiting value above which a turning maneuver is physically impossible. The prediction of the driving maneuver may also be delayed until a sufficiently large data base has been created by recording the physical history, or until the similarity degree for at least one of the tested hypotheses exceeds a certain threshold value. Finally, it is also possible to terminate the test of a hypothesis when it is found during the continued recording of the history that the measured yaw rate deviates by more than a certain extent from the theoretical yaw rate for the particular hypothesis.

Exemplary embodiments are described in greater detail hereafter based on the figures.

DETAILED DESCRIPTION OF EXAMPLE EMBODIMENTS

Figure 1:
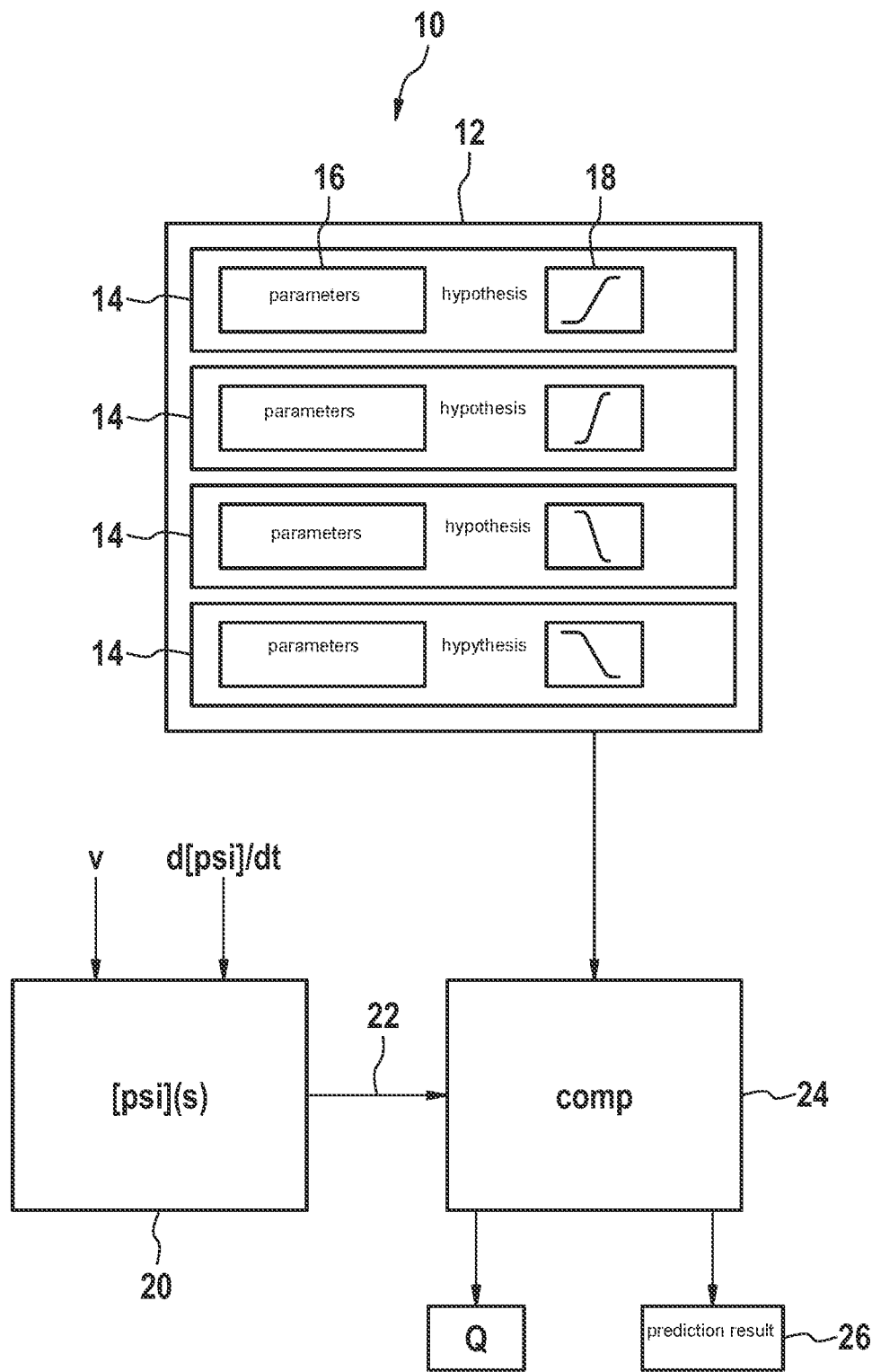
FIG. 1 shows a block diagram of a prediction module with the aid of which the method according to an example embodiment of the present invention is executable.

FIG. 1 shows a prediction module 10 as a block diagram, which is part of a driver assistance system for motor vehicles. The prediction module is formed by suitable software which runs on a computer installed in the vehicle.

Hypotheses 14 for different driving maneuvers, for example for straight-ahead driving and different turning maneuvers, are stored in a hypotheses library 12. Each hypothesis 14 encompasses a set of parameters 16 which characterize the driving maneuver, as well as a history 18 calculated from these parameters, which indicates one or multiple variable(s) characterizing the state of the vehicle as a function of the time or, equivalent thereto, as a function of the path covered by the vehicle during the driving maneuver, for the duration of the driving maneuver. In particular, history 18 includes at least one function which indicates the curve of a dynamic variable of the vehicle, which may be measured using vehicle-internal sensors. The output signals of these sensors form input variables which are continuously evaluated in prediction module 10.

In the shown example, these dynamic variables are velocity v of the vehicle as well as yaw rate d[psi]/dt. The yaw rate may be calculated from the signals of wheel speed sensors, for example, which also form the basis for the measurement of driving velocity v. Selectively or additionally, the yaw rate may also be measured with the aid of an inertial sensor. In recording module 20, path s covered by the vehicle is calculated from velocity v by integration over the time, and present yaw angle [psi] is also calculated by integration of the yaw rate, and function [psi](s) is recorded for a certain time interval, for example for several seconds, and is continuously updated. The reference point for path s and yaw angle [psi](s) in the process are the present position of the vehicle as well as the present orientation. According to the definition, s=0 thus indicates the present position, and [psi]=0 indicates the present yaw angle of the vehicle. For the sake of simplicity, it shall be assumed as an example that the input variables are updated using a fixed sample rate 1/T. After each update of the data, path [delta]s which the vehicle has covered during sample period T is then calculated from velocity v, and change [delta][psi] of yaw angle is accordingly calculated based on the present yaw rate. All values of s and [psi] stored in the recording module are then decreased by [delta]s or [delta][psi]. Since recording module 20 has only a limited memory capacity, the respective oldest value pair is discarded. As a result, the recording module at any point in time includes a history 22 which indicates the curve of function [psi](s) during a past time interval of a fixed length. This history 22 is reported to a comparison module 24 and is continuously updated at the cycle of sample rate 1/T.

In comparison module 24, the recorded history 22 is continuously compared to at least one of history 18 stored in hypotheses library 12. In the normal case, during straight-ahead driving of the vehicle, the recorded history 22 is compared to a straight-ahead driving history which is formed by function [psi](s)=0 for all s. As long as the most recent value of the recorded history 22 deviates from 0 by less than a certain threshold value, comparison module 24 supplies the value "straight-ahead driving" as prediction result 26. In addition, the comparison module supplies a quality value Q, which indicates how reliable prediction result 26 is. Quality value Q may be calculated, for example, by calculating the mean square deviation of the recorded yaw angles [psi] from the theoretical value (0 in this example), standardizing it, and then subtracting it from 1, so that Q=1 means that the result is absolutely certain, and Q=0 means that the result is completely uncertain.

As soon as the most recent value in the recorded history deviates significantly from 0, depending on the situation at least one other of the stored hypotheses 14 is tested by comparing the recorded history 22 to history 18 belonging to this hypothesis 14. In the process, it is assumed that the first value deviating from 0 marks the starting point of the stored history 18. Prediction result "straight-ahead driving" is initially still maintained, however quality value Q decreases with an increasing number of yaw angles deviating from 0. At the same time, a new quality value Q is formed for each tested hypothesis. During the standardization of this quality value, the statistical uncertainty due to the initially still small and then slowly expanding database is also taken into consideration. When the number of yaw angles deviating from 0 has reached a certain minimum value or, alternatively, when the quality value for the tested hypothesis has reached a certain minimum amount, this hypothesis is output as the new prediction result 26, and the output quality value Q is replaced with the quality value for this hypothesis.

In general, each of the stored hypothesis 18 may be tested as soon as the first yaw angle deviates significantly from 0. The selection of the tested hypotheses, however, may also depend on different factors which describe the present traffic situation. For example, no hypotheses for turning maneuvers need to be tested as long as velocity v is so high that no turning maneuver may take place. A test of turning hypotheses may also be dispensed with when the position of the vehicle located on a digital map shows that no turning possibility exists.

Figure 2:
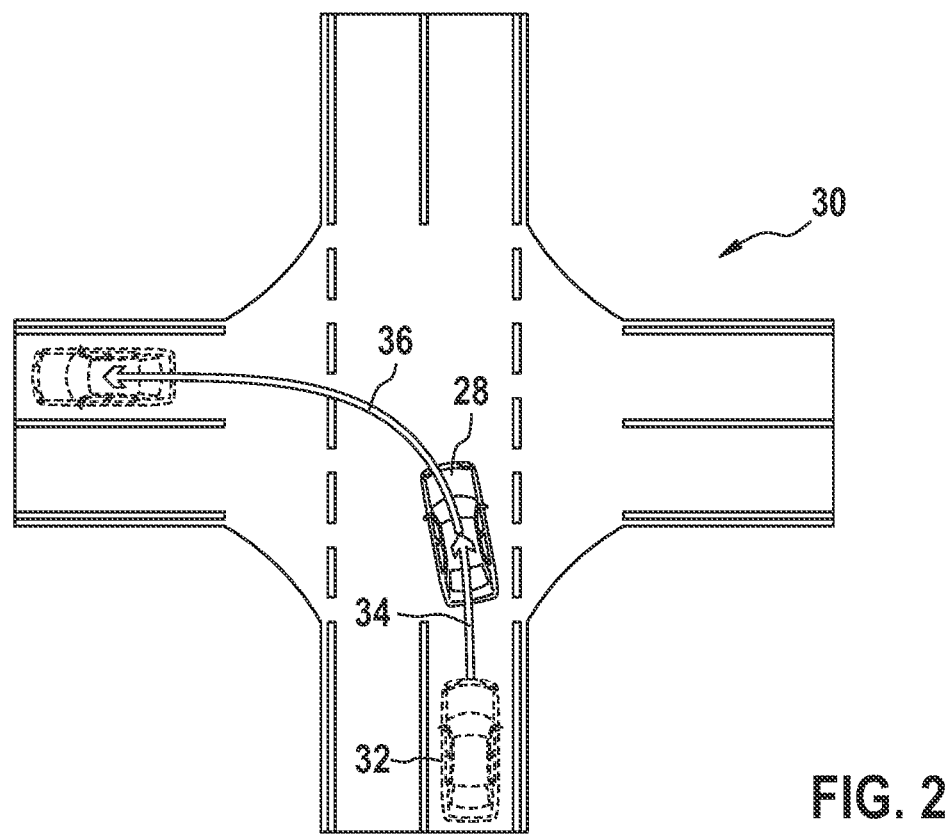
FIG. 2 shows an illustration of a turning maneuver "turning left."

FIG. 2 illustrates a situation in which a vehicle 28 equipped with the driver assistance system has entered an intersection 30. In addition to hypothesis "straight-ahead driving," hypotheses "turning left" and "turning right" would also have to be tested here. However, the yaw angle has already increased slightly compared to straight-ahead driving, so that hypothesis "turning left" appears to be more likely and is further tested. Based on the recorded history 22, it is possible to back-calculate the point at which history 18 for the turning maneuver has its beginning. The corresponding position 32 of the vehicle is shown with dotted lines in FIG. 2. The recorded history 22 is then calibrated in such a way that position 32 coincides with the starting point of history 18. The path of the vehicle covered since this point is indicated by an arrow 34 in FIG. 2.

Figure 3:
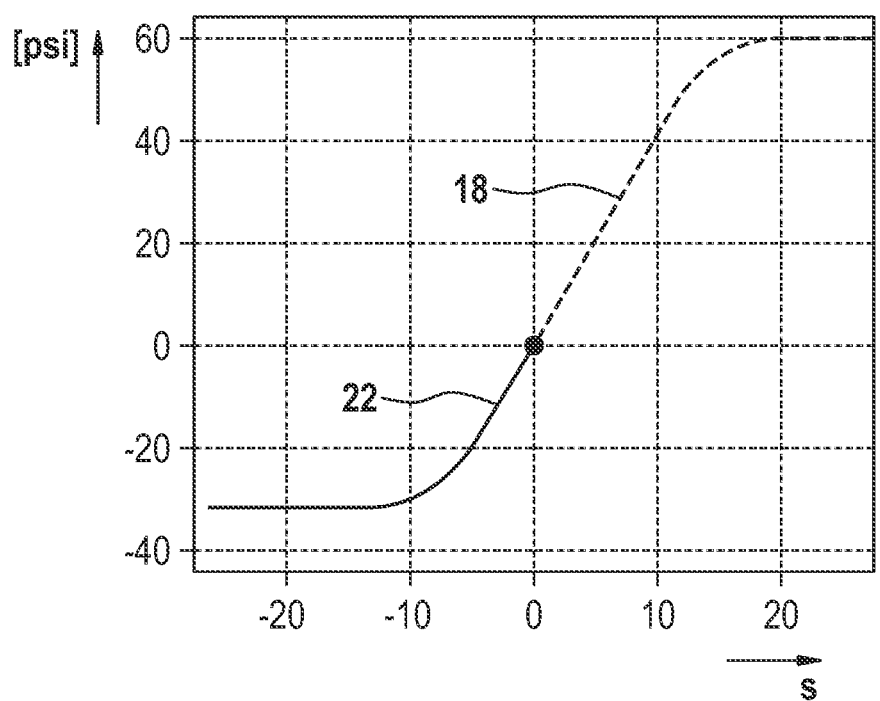
FIG. 3 shows a graphical representation of a history for the turning maneuver according to FIG. 2.

FIG. 3 shows the recorded history 22 for the situation shown in FIG. 2 in a solid line. Theoretical history 18, which at the same time represents the prediction for the further course of the driving maneuver, is shown with dotted lines in FIG. 3. The associated presumable trajectory of the vehicle is indicated by an arrow 36 in FIG. 2.

Three phases may be distinguished in history 18 and the associated driving maneuver. In an introductory phase, which in FIG. 3 extends approximately from s=−12 to s=−5, the yaw rate increases linearly so that yaw angle [psi] grows quadratically. At s=−5, the yaw rate has reached a maximum value, which is then constantly maintained in the main phase of the maneuver up to approximately s=10. Thereafter, an expansion phase begins during which the yaw rate decreases linearly to the value 0. At the end of the driving maneuver, the yaw angle has increased by 90°, from −30° to +60°, corresponding to the hypothesis that a 90° arc is passed through during the driving maneuver.

Figure 4:
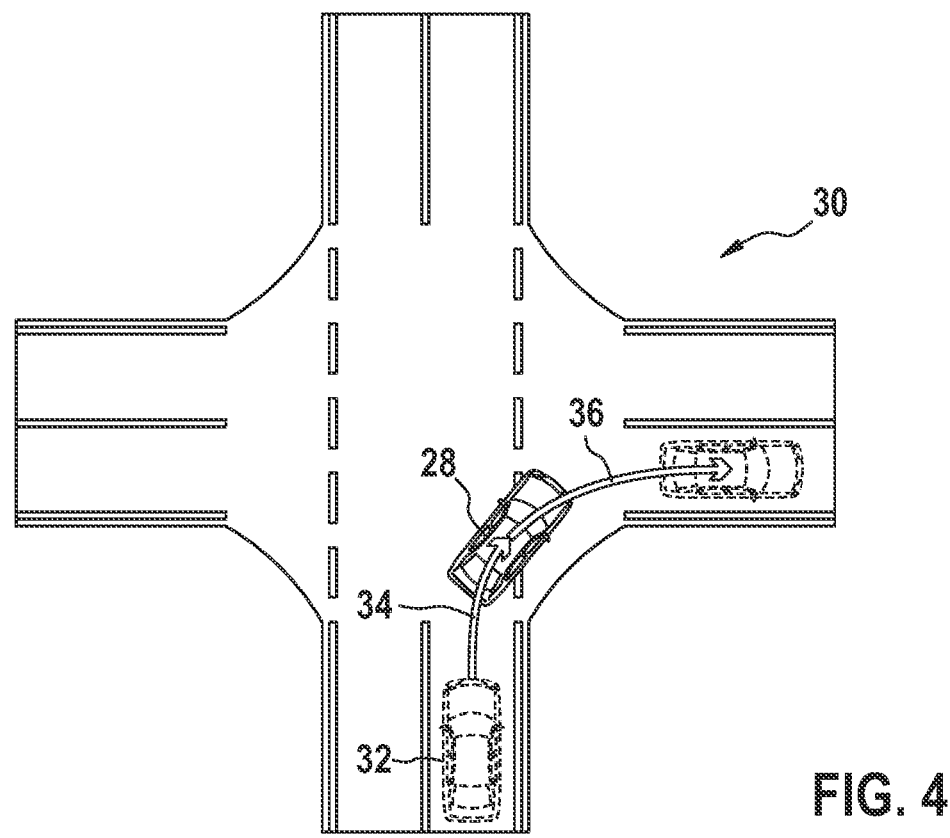
FIG. 4 shows an illustration of a turning maneuver "turning right."
Figure 5:
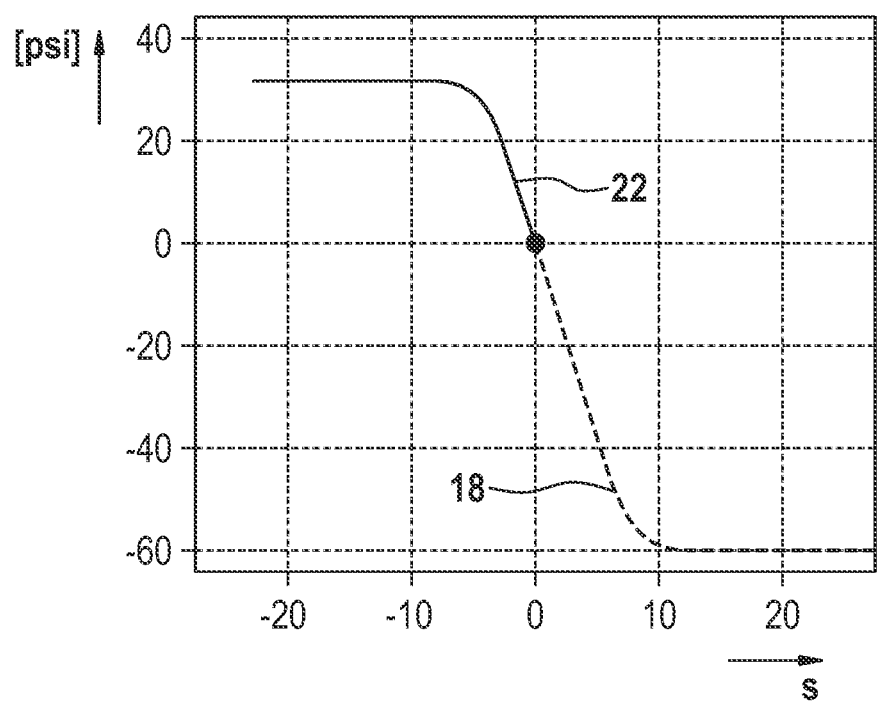
FIG. 5 shows a graphical representation of a history for the turning maneuver according to FIG. 4.

For comparison, FIGS. 4 and 5 illustrate a situation in which a driving maneuver "turning right" takes place. Since the yaw angle decreases in a right-hand curve, histories 22 and 18 form a downward-sloping curve in FIG. 5. In addition, the radius of curvature of the trajectory in the main phase of the turning process is smaller when turning right than when turning left in countries with right-hand traffic. Accordingly, the yaw rate is larger in the main phase so that the curve in FIG. 5 is steeper and is compressed along the s axis. During the calculation of histories 18 for the different hypotheses, a standard width of the mutually intersecting streets may be assumed. When information about the actual dimensions of the intersection is known from a digital map, the calculation of the theoretical history may presently also take place based on these data.

Figure 6:
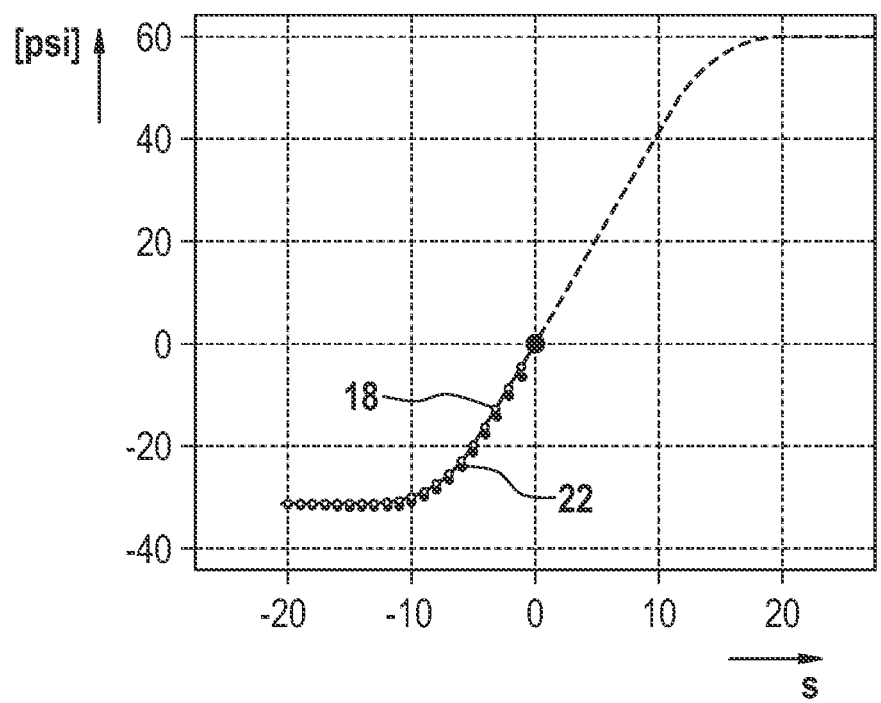
FIG. 6 shows a graphical representation for explaining a test of a hypothesis for a driving maneuver.

FIG. 6 shows the test of a hypothesis for a maneuver "turning left" in a diagram similarly to FIGS. 3 and 5. The recorded history 22 is represented by individual measuring points here, which are shown as black dots in the diagram. The corresponding measuring points which represent the theoretical history 18 are shown as white dots. A similarity degree is now calculated for the test of the hypothesis, which indicates the degree of agreement between histories 18 and 22, for example based on the mean square deviation, as described above for quality value Q.

The determination of the prediction result may now take place, for example, by testing multiple possible hypotheses, and then selecting the hypothesis for which the degree of similarity is the greatest. When history 18 correctly describes the actual driving maneuver, the degree of similarity will converge toward the value 1 with increasing duration of the recording of history 22.

In general, however, none of the predefined hypotheses 14 will exactly match the recorded history 22. In this case, the degree of similarity remains smaller than 1 for all histories. It is now possible to select either the hypothesis having the greatest degree of similarity as the prediction result, or a new hypothesis is generated by forming a sum from the predefined hypotheses 18 which is weighted according to the degree of similarity.

Figure 7:
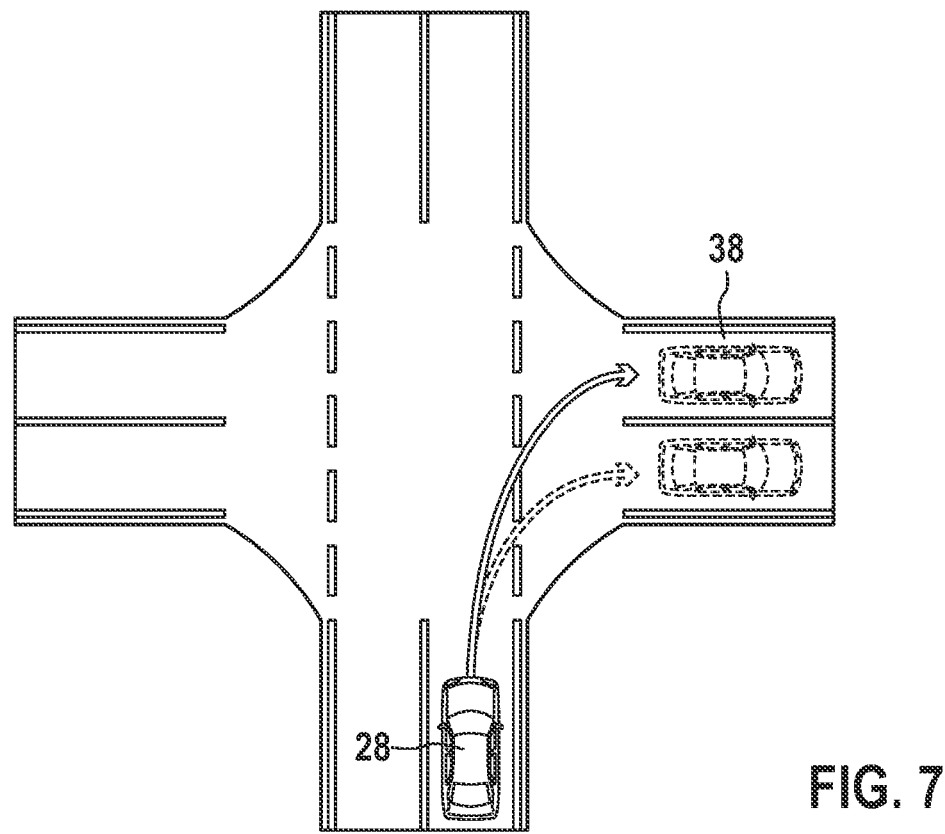
FIG. 7 shows an illustration of possible turning maneuvers while turning into a multi-lane street.

FIG. 7 illustrates an example in which the driving maneuver is a turning process to the right into a two-lane intersecting street 38 (a one-way street). The hypotheses to be tested here are that vehicle 28 turns either into the right lane or the left lane of intersecting street 38.

What is claimed is:

1. A method of a motor vehicle, the method comprising the following steps: during a driver's drive of the vehicle: continuously recording by the vehicle at least one predefined parameter detected by sensors of the vehicle to form a moving window, corresponding to a predefined period of time, of a representation of a change over time of the at least one predefined parameter; continuously comparing a current state of the representation of the moving window in a current state, which continuously changes, to subsections of respective representations of a change over time of the at least one predefined parameter of respective predefined theoretical driving maneuvers corresponding to a period of time that is larger than the predefined period of time to which the moving window corresponds, wherein each of the predefined theoretical driving maneuvers is calculated based on a model in which a particular one of the at least one predefined parameter: increases linearly to a maximum value of the particular predefined parameter in a first phase of the respective driving maneuver; remains constant in a second phase of the respective driving maneuver; and decreases linearly in a third phase of the respective driving maneuver; based on the continuous comparing, dynamically determining to which of the predefined theoretical driving maneuvers the drive of the vehicle matches best; based on the matching, predicting a future course of the drive to follow a further subsection of the predefined theoretical driving maneuver that is currently determined to be the best match, the further subsection following the subsection of the predefined theoretical driving maneuver that is currently determined to be the best match to which the comparison was made; and in response to the prediction, the vehicle performing an automatic driving maneuver of a drive assistance system of the vehicle intervening in the driver's drive of the vehicle.

2. The method as recited in claim 1, further comprising generating a quality value that is calculated based on a degree of similarity of the best match and that indicates a reliability of the prediction.

3. The method as recited in claim 1, wherein the at least one predefined parameter include at least a driving velocity and a yaw rate.

4. The method as recited in claim 3, wherein the representation of the change over time represents a yaw angle of the vehicle as a function of a path covered by the vehicle.

5. The method as recited in claim 4, wherein the respective representations of the change over time of the at least one predefined parameter of the respective predefined theoretical driving maneuvers each encompasses at least one maximum yaw rate which is reached during the respect theoretical driving maneuver.

6. The method as recited in claim 1, wherein the prediction is made by summing data of a plurality of the predefined theoretical driving maneuvers weighted according to respective degrees of similarity determined by the comparing for respective ones of the predefined theoretical driving maneuvers.

7. The method as recited in claim 1, wherein the predicting is additionally dependent on additional information about a driving state of the vehicle and/or a traffic infrastructure.

8. A method for a motor vehicle, the method comprising the following steps:
recording a representation of dynamic data of the vehicle detected by sensors of the vehicle during a first part of a current driving maneuver performed by a driver-operation of the vehicle, wherein the dynamic data include at least a driving velocity and a yaw rate and the representation indicates a change of a yaw angle of the vehicle as a function of a path covered by the vehicle;
representing multiple hypotheses for potentially occurring driving maneuvers by respective associated sets of parameters, wherein the sets of parameters for each of the hypotheses encompass at least one maximum yaw rate which is reached during the respective driving maneuver;
calculating a theoretical representation of the driving maneuver based on the parameters for each of the hypotheses, wherein each of the theoretical representations is calculated based on a model in which the yaw rate in a first phase of the respective driving maneuver increases linearly to a maximum yaw rate, remains constant in a second phase, and decreases linearly in a third phase;
comparing the recorded representation to at least one of the theoretical representations;
based on a degree of similarity of the recorded representation and the at least one of the theoretical representations determined by the comparing, predicting a continued future course of the current driving maneuver that will result from a continuation of the driver-operation of the vehicle to follow a course represented by one or more of the hypotheses that is determined to describe the current driving maneuver with a highest probability; and
in response to the prediction, the vehicle performing an automatic driving maneuver of a drive assistance system of the vehicle intervening in the driver-operation of the vehicle.

9. A driver assistance system for a motor vehicle, comprising: drive controls; and a processor, wherein the processor is configured to: during a driver's drive of the vehicle: continuously record at least one predefined parameter detected by sensors of the vehicle to form a moving window, corresponding to a predefined period of time, of a representation of a change over time of the at least one predefined parameter; continuously compare a current state of the representation of the moving window in a current state, which continuously changes, to subsections of respective representations of a change over time of the at least one predefined parameter of respective predefined theoretical driving maneuvers corresponding to a period of time that is larger than the predefined period of time to which the moving window corresponds, each of the predefined theoretical driving maneuvers being calculated based on a model in which a particular one of the at least one predefined parameter: increases linearly to a maximum value of the particular predefined parameter in a first phase of the respective driving maneuver; remains constant in a second phase of the respective driving maneuver; and decreases linearly in a third phase of the respective driving maneuver; based on the continuous comparing, dynamically determine to which of the predefined theoretical driving maneuvers the drive of the vehicle matches best; based on the matching, predict a future course of the drive to follow a further subsection of the predefined theoretical driving maneuver that is currently determined to be the best match, the further subsection following the subsection of the predefined theoretical driving maneuver that is currently determined to be the best match to which the comparison was made; and in response to the prediction, operating the drive controls to perform an automatic driving maneuver of the drive assistance system of the vehicle intervening in the driver's drive of the vehicle.

10. A non-transitory computer-readable storage medium on which is stored program code that is executable by a processor of a motor vehicle and that, when executed by the processor, causes the processor to perform a method, the method comprising: during a driver's drive of the vehicle: continuously recording at least one predefined parameter detected by sensors of the vehicle to form a moving window, corresponding to a predefined period of time, of a representation of a change over time of the at least one predefined parameter; continuously comparing a current state of the representation of the moving window in a current state, which continuously changes, to subsections of respective representations of a change over time of the at least one predefined parameter of respective predefined theoretical driving maneuvers corresponding to a period of time that is larger than the predefined period of time to which the moving window corresponds, wherein each of the predefined theoretical driving maneuvers is calculated based on a model in which a particular one of the at least one predefined parameter: increases linearly to a maximum value of the particular predefined parameter in a first phase of the respective driving maneuver; remains constant in a second phase of the respective driving maneuver; and decreases linearly in a third phase of the respective driving maneuver; based on the continuous comparing, dynamically determining to which of the predefined theoretical driving maneuvers the drive of the vehicle matches best; based on the matching, predicting a future course of the drive to follow a further subsection of the predefined theoretical driving maneuver that is currently determined to be the best match, the further subsection following the subsection of the predefined theoretical driving maneuver that is currently determined to be the best match to which the comparison was made; and in response to the prediction, the vehicle performing an automatic driving maneuver of a drive assistance system of the vehicle intervening in the driver's drive of the vehicle.

* * * * *